Figure 1A:
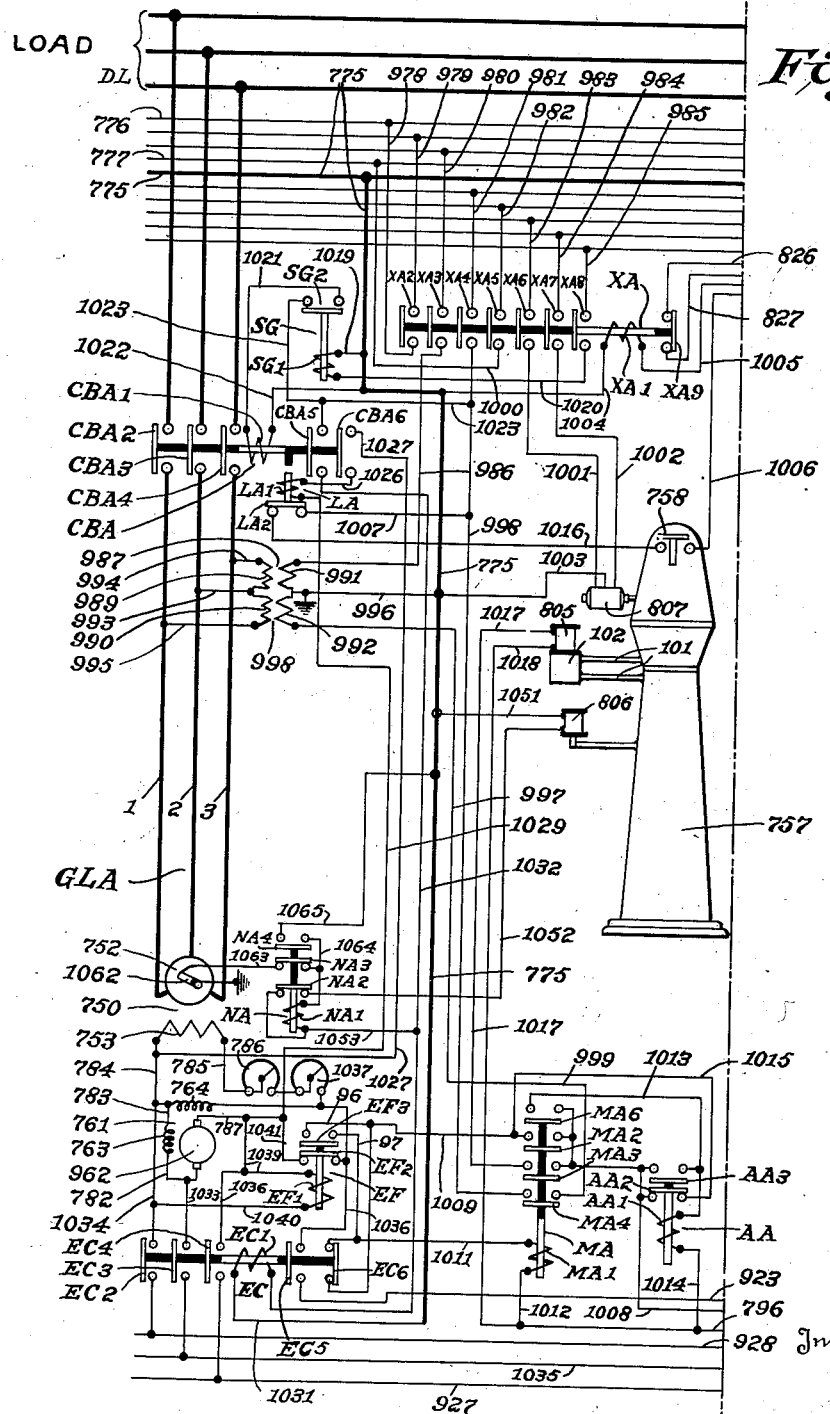

Aug. 11, 1936.  E. PEARSON  2,050,373
SYSTEM FOR THE REMOTE OPERATION OF POWER PLANTS
Original Filed July 6, 1931  3 Sheets-Sheet 1

Inventor:
Erick Pearson,
By Herbert H. Porter
Attorney.

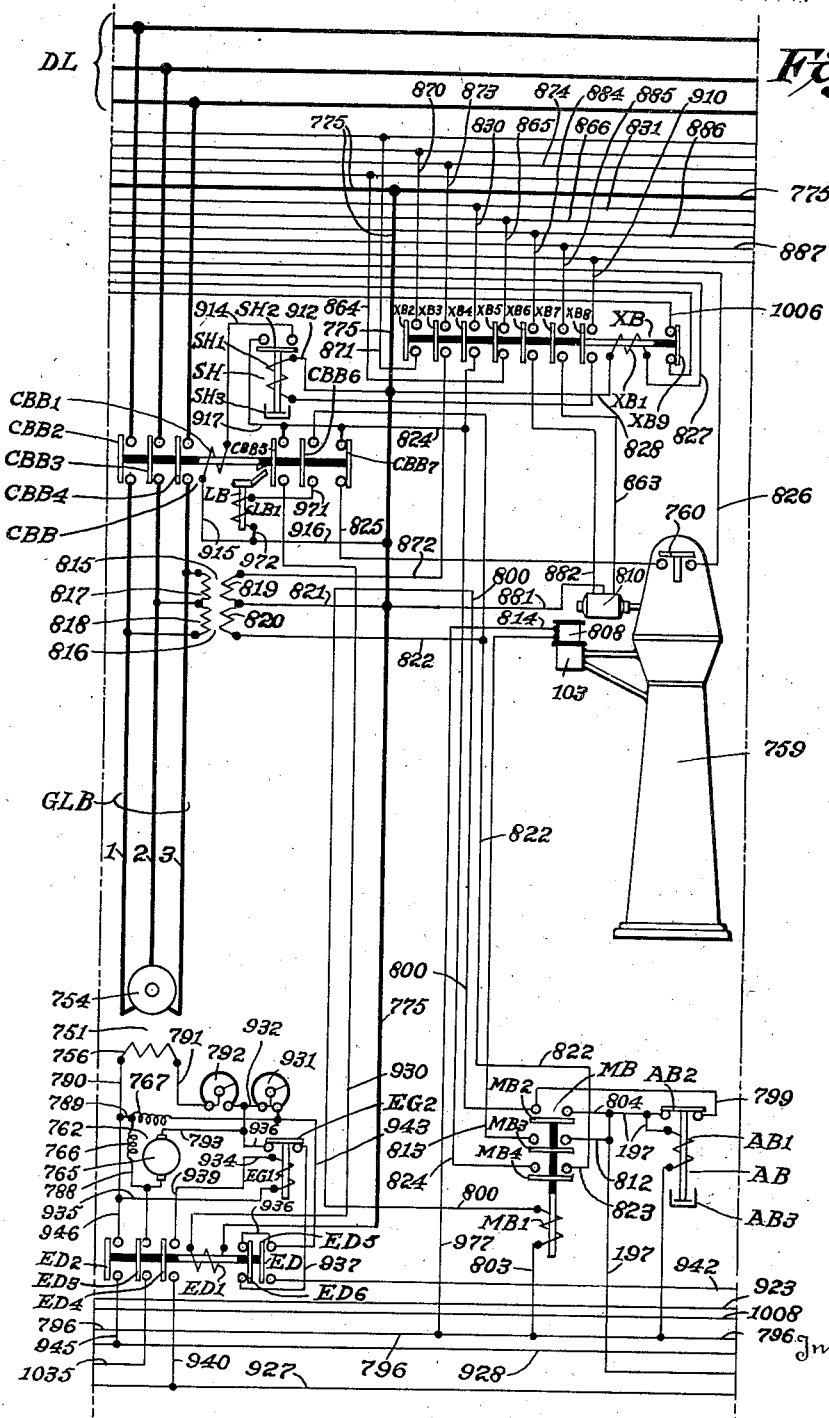

Aug. 11, 1936.    E. PEARSON    2,050,373
SYSTEM FOR THE REMOTE OPERATION OF POWER PLANTS
Original Filed July 6, 1931    3 Sheets-Sheet 3
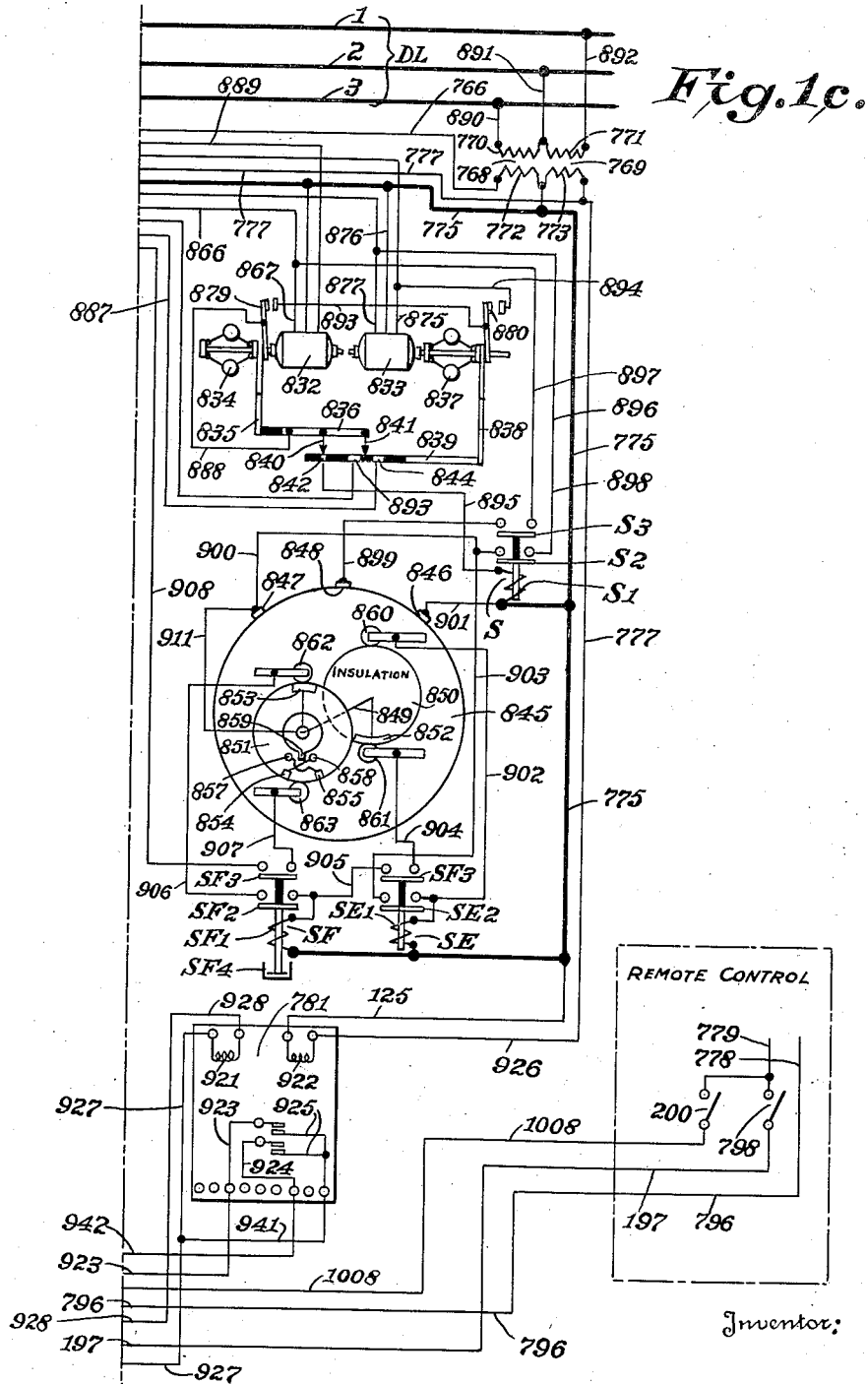

Patented Aug. 11, 1936

2,050,373

UNITED STATES PATENT OFFICE 2,050,373

SYSTEM FOR THE REMOTE OPERATION OF POWER PLANTS

Erick Pearson, Chicago, Ill.

Application July 6, 1931, Serial No. 548,906
Renewed November 2, 1935

9 Claims. (Cl. 171—118)

My invention relates to power plants and to apparatus for the operation thereof and has for an object to provide a system whereby a plurality of electrical units may be operated or controlled from a single device.

Another object of the invention resides in providing a system in which a plurality of generators may be successively synchronized through a single synchronizer.

An object of the invention resides in providing a system in which the governors of a plurality of generators may be individually adjusted through a single control apparatus.

Another object of the invention resides in providing a system in which the voltage of a plurality of generators may be regulated through a single voltage regulator.

A feature of the invention resides in providing a system in which the control of the generator is accomplished through a pair of centrifugal devices operating in unison with one another.

An object of the invention resides in providing a system in which the synchronizing mechanism is rendered operable when the two centrifugal devices reach predetermined relative positions.

Another object of the invention resides in providing a plurality of generators with separate exciters therefor and in providing a single voltage regulator for procuring the same potentials at said exciters to maintain predetermined voltages for both generators.

Another object of the invention resides in providing a resistance in series with the exciter field coil and providing a switch for shunting said resistance and in further providing a potentially operated device for opening said switch after the potential of the exciter reaches a predetermined value to cause the positive building up of the exciter.

Another object of the invention resides in providing means including a switch for connecting the exciter to the potential regulator when the generator unit has been connected to the distribution system.

An object of the invention resides in providing a system including a plurality of generators, each having an exciter and in further providing a single voltage regulator therefor adapted to simultaneously regulate the voltages of all of said generators in accordance with the potential of the distribution system.

Another object of the invention resides in providing means for disconnecting any of the generators from the voltage regulator upon disconnection of said generator from the distribution system.

A still further object of the invention resides in providing a protective device in which closure of the circuit breaker is prevented in the event that the exciter fails to build up and in which the circuit breaker is opened in the event that the exciter voltage drops below a predetermined value.

An object of the invention resides in providing in combination with a distribution system, a plurality of generators having a plurality of exciters and a common bus for connecting said exciters in parallel and in still further providing means for connecting said exciters to said bus upon connection of said generators to the distribution system.

Another object of the invention resides in providing an over speed switch operated by the generator and a power switch adapted to be operated by the generator line and in further providing means controlled by said switches for regulating the gate opening of the generator turbine, said switches serving to bring the generator back to no load speed in the event the speed of the generator should accidentally exceed a predetermined speed limit.

A still further object of the invention resides in providing a time delayed switch adapted to operate the circuit breaker for connecting the generator to the distribution system, said switch closing rapidly and opening slowly to permit the circuit breaker to close within a predetermined length of time.

An object of the invention resides in providing a circuit breaker for connecting the generator to the distribution line and in providing means operated through the exciter potential for maintaining the circuit breaker closed.

Other objects of the invention reside in the novel combination and arrangement of parts and in the details of construction hereinafter illustrated and/or described.

In the drawings:

Figs. 1a, 1b and 1c together comprise a wiring diagram of a system illustrating an embodiment of my invention.

In the drawings, a system has been shown comprising a power plant feeding a distribution line DL comprising the three phase conductors 1, 2, and 3. In this system, two generators 750 and 751 are employed; the generator 750 is provided with an armature 752 and a field coil 753 and the generator 751 is provided with an armature 754 and a field coil 756. The armature 752 is connected to a generator line GLA having phases 1, 2 and 3, while the generator 751 is connected to a generator line GLB having phases 1, 2 and 3. The generator line GLA may be connected to the distribution line DL through a circuit breaker CBA while the generator line GLB may be connected to the distribution line through a circuit breaker CBB. The circuit breaker CBA is provided with a coil CBA1 and with five normally open switches CBA2, CBA3, CBA4, CBA5 and CBA6. The circuit breaker CBB is constructed with a coil CBB1 and with five normally open switches CBB2, CBB3, CBB4, CBB5, CBB6 and with a normally closed switch CBB7.

The generator 750 is provided with a governor 757 which may be of ordinary construction and which is adapted to control the speed of the prime mover (not shown) which is connected with said generator and to further control the load taken by the generator. Governor 757 is of the centrifugal type having flyballs acting against a spring to open and close one or more control valves through which the gate governing the flow of water to the turbine is regulated to deliver the desired amount of power to the generator and to control the speed of the turbine. The regulation of the gate is effected through oil or some other suitable fluid under pressure as is customary and the initial operation of the governor takes place upon the opening of a suitable valve in the oil line. For the purpose of illustration, the oil line has been indicated at 101 and the valve therein at 102. The governor spindle for rotating the flyballs may be operated in any suitable manner as by a mechanical drive from the prime mover or generator when the governor is closely positioned or through an electric motor or other source of power when desired. Such construction and the construction of the governor being well known in the art and as illustrated in my copending application for patent Serial No. 481,948 has not been described and illustrated in detail in this application.

The governor is provided with a centrifugally operated switch 758 which is adapted to close when the speed of the governor reaches a predetermined value. This switch may be controlled from the governor spindle operating the fly balls or from any other source of rotary motion rotating in synchronism with or at a speed proportioned to that of the generator.

A starting solenoid 805 is employed which operates the valve 102. When this solenoid is energized the valve 102 is opened and the governor subjected to the oil under pressure controlled thereby, the gate may then be regulated in response to the action of the flyballs of the governor.

A reversible motor 807 further operates upon the spring of the governor to vary the pressure exerted by the same on the flyballs, said motor serving to increase the pressure when rotated in one direction and to decrease the pressure when rotated in the other direction.

In a similar manner a governor 759 is employed for the generator 751 which governor is provided with a switch 760 similar to the switch 758. This governor is also provided with a starting solenoid 808 including an oil valve 103, and a reversible motor 810.

Operating in conjunction with the generator 750, is a transfer relay XA which includes a coil XA1 and seven normally open switches XA2, XA3, XA4, XA5, XA6, XA7 and XA8 and a normally closed switch XA9. This generator is further provided with a master relay MA which comprises a coil MA1, and four normally open switches MA2, MA3, MA4 and MA5. The generator 751 is likewise provided with a transfer relay XB which comprises a coil XB1, seven normally open switches XB2, XB3, XB4, XB5, XB7 and XB8 and one normally closed switch XB9. A master relay MB is also utilized with generator 751. This relay comprises a coil MB1, and three normally open switches MB2, MB3, MB4.

Each of the two generators is provided with its own exciter, the exciter for the generator 750 being designated by the reference numeral 761 and the exciter for the generator 751 being designated by the reference numeral 762. These exciters may be directly operated from the prime mover for the generator or may be operated in any other suitable manner, if desired. The exciter 761 comprises an armature 962, a series field coil 763 and a shunt field coil 764. The other exciter 762 comprises an armature 765, a series field coil 766, and a shunt field coil 767.

Current for operating the various apparatus used in conjunction with the invention at the substation is procured from two single phase transformers 768 and 769, said transformers having primaries 770 and 771 and secondaries 772, and 773. The primaries 770 and 771 of these transformers are connected to the three phases 1, 2, and 3 of the distribution line through conductors 890, 891 and 892. The two secondaries 772 and 773 of these transformers are connected together and to a common bus 775 and are further connected to busses 776 and 777.

The control line for operating the power plant by remote control is designated by numerals 778 and 779 and may procure energy from any suitable source. Inasmuch as the control apparatus may be operated either by direct current or by alternating current, the source of electric energy for this line has not been shown.

Operating in conjunction with the two generators 750 and 751 is a single synchronizing device indicated in its entirety at 845 and a single voltage regulating device 781 which will be subsequently described in detail and which may be used in conjunction with either or both of the generators as will later more fully appear.

The exciter 761 is connected to the generator 750 as follows. The series coil 763 of exciter 761 is connected to the armature 962 thereof through a conductor 782. This coil is further connected through a conductor 783 with the shunt coil 764, said conductor being in turn connected to another conductor 784 which leads to the field coil 753 of generator 750. The other side of the field coil 753 of generator 750 is connected through a conductor 785 with a rheostat 786 which in turn is connected through a conductor 787 with the other side of the armature 962 of exciter 761. By regulating the rheostat 786 the desired voltage may be had across the field 753 of the generator.

In a similar manner the field coil 766 of the exciter 762 is connected through a conductor 788 with the armature 765 of said exciter. Conductor 789 connects the series coil 766 to the shunt coil 767 and is itself connected to another conductor 790 which in turn is connected to the field coil 756 of generator 751. The other side of the field coil 756 is connected through a conductor 791 with a rheostat 792 similar to the rheostat 786. This rheostat is connected through a conductor 793 with the other side of the armature 765 of exciter 762.

In the event that the master relay is open due to various failures detected by any of the protective devices to be subsequently explained, it becomes undesirable that the master relay be again connected after the correction of the failure. To prevent such re-connection of the apparatus, two relays AA and AB are employed which I have termed anti-start relays, which relays are operative to prevent the closing of the master relays MA and MB, except by manual means at the control station. The relay AA comprises a coil AA1, a normally closed switch AA2, and a normally open switch AA3. The relay AB comprises a coil AB1, and a normally closed switch AB2. This relay is a time controlled relay and is provided with a dash pot AB3 or similar equivalent which prevents the opening of the switch AB2 until a predetermined time has elapsed after the relay AB has been energized.

The two relays MA and MB are energized from the control circuit 778 and 779 as follows. The control line 779 is connected to two switches, 200 and 798. The operation of the master relay MB is controlled through the switch 798 while the operation of the master relay MA is controlled through the switch 200. The master relay MA governs the operation of generator 750 while master relay MB governs the operation of generator 751.

The various circuits controlled by relay MB will be first described in detail. A bus 796 is connected to the side 778 of the control line. Switch 798 is connected through conductor 797 with coil AB1 of relay AB, which coil is further connected to bus 796. Conductor 797 is also connected to switch AB2 of relay AB which in turn is connected through a conductor 799 to switch MB2. Conductor 799 is further connected to another conductor 800 which in turn is connected with coil MB1 which in turn is connected through conductor 803 with the bus 796.

Upon closing switch 798 two circuits are established, the one being through the coil AB1 of relay AB and the other being through the coil MB1 of relay MB. The relay AB being a timed relay does not open switch AB2 until after the lapse of a predetermined length of time. During this time the relay MB is given an opportunity to close. If said relay does not close within this length of time, switch AB2 opens and the circuit through the coil MB1 of relay MB is broken. Thereafter said relay cannot be closed unless the switch 798 is manually operated to cause the relay AB to be re-set. If however everything is in proper condition, coil MB1 operates relay MB and the various switches MB2, MB3 and MB4 thereof are closed. As soon as relay MB is operated, the circuit through the coil MB1 thereof is maintained through the switch MB2. This switch is connected through a conductor 804 with conductor 799 thereby shunting switch AB2. After relay MB is closed, the relay AB may function to open the switch AB2 without affecting the relay MB.

The operation of relay MB, as stated, closed switch MB3. This switch is connected through a conductor 812 with conductor 797 and is further connected through conductor 813 with solenoid 808. Solenoid 808 is connected through a conductor 814 with the bus 796. Closure of switch MB3 energizes solenoid 808 which opens the valve 103 controlling the oil pressure system and sets the governor 759 into operation and starts the operation of the turbine or prime mover driving generator 751.

For operating certain of the equipment controlling generator 751, two single phase transformers 815 and 816 are employed having primaries 817 and 818 and secondaries 819 and 820. The primaries 817 and 818 of these transformers are connected to the generator line GLB and receive potential from the generator when the same comes up to speed. The two secondaries 819 and 820 are connected together and are connected to a common lead 821 which in turn is connected to the common lead 775 previously referred to. The secondary 820 of the transformer 816 is connected to a bus 822 and the secondary 819 of transformer 815 is connected to a bus 872, which provides potential for operating a number of devices to be presently referred to.

The switch MB4 of relay MB is connected through a conductor 823 with bus 822 of transformer 816 and is further connected through a conductor 824 with the normally closed switch CBB7 of circuit breaker CBB. This switch in turn is connected through conductor 825 with the centrifugal switch 760 of governor 759. A conductor 826 leads from this switch to the normally closed switch XA9 of the transfer relay XA for generator 750. This switch is connected through a conductor 827 with coil XB1 of relay XB. A conductor 828 connects this coil with the common bus 775. When the generator gets up to speed, switch 760 closes which completes the circuit through the various switches and conductors last named providing the exciter is in operation and is delivering sufficient excitation current to bring the generator up to voltage. When this occurs, the coil XB1 of relay XB is energized which closes transfer relay XB. It will be noted that the normally closed switch XA9 of relay XA is included in the above named circuit. This is for the purpose of preventing the attempted cutting in of the generators at the same time which could not be accomplished unless all of the transfer relays of the other generators are out. When coil XB1 is energized relay XB is closed and further new circuits established, which operates the speed matching and synchronizing mechanism of the invention which will now be described in detail.

The speed matching mechanism of the invention comprises two motors 832 and 833 which are preferably in the nature of synchronous motors or motors rotating at a speed proportionate to the frequencies of the systems from which they are operated. Motor 832 is operated from the generator to be cut in while the motor 833 is operated from the distribution system. The motor 832 drives a governor 834 adapted to swing a lever 835 and to slide a contactor bar 836 in a direction parallel to the axis of the motor shaft. Motor 833 similarly drives a governor 837 which is connected to a swinging lever 838 and is adapted to move a contact bar 839 in accordance with the speed of said motor. The governors 834 and 837 are so constructed that both contactor bar 836 and contact bar 839 move in the same direction as the two motors increase in speed so that relative movement of the contactor bar 836 and the contact bar 839 is only produced when the motors travel at different speeds and the relative position of said contact bar and contactor bar are independent of the direction of rotation of the motors, the absolute speed of the motors and the phase relation of the currents energizing the same. The contactor bar 836 is provided with two contact fingers or contactors 840 and 841 while the contact bar 839 is provided with three contacts 842, 843, 844. The former is adapted to contact with contactor 840 while the contactor 841 is adapted to alternately engage with either contacts 843 or 844 which are insulated from one another and from the contact 842.

The synchronizer used in conjunction with the invention may be of any ordinary form and as stated is indicated in its entirety at 845. This synchronizer may be provided with separate rotor and stator coils (not shown) which are connected together and to a common binding post 846. These two coils are further connected to two other binding posts 847 and 848. The synchronizer 845 is constructed with a shaft 849 adapted to be rotated through when current energizes the coils of said synchronizer. This shaft rotates at a speed dependent upon the difference in frequencies of the currents in the two lines connected to the synchronizer. Said synchronizer is further constructed so that the shaft 849 has a definite position with respect to the synchronizer case when the currents in the two lines energizing the synchronizer are in phase relation. Connected to the shaft 849 are two discs 850 and 851 of insulating material. The disc 850 is provided with a contact 852 which is connected to the shaft 849 while the disc 851 is provided with a contact 853, also connected to shaft 849 and with two other spaced contacts 854 and 855 disposed on the side of the disc 851 opposite to the contact 853. These contacts are connected to two other contacts 857 and 858 which are adapted to be alternately engaged by a finger 859 frictionally driven by shaft 849 and adapted to contact with either of the contacts 857 and 858 depending upon the direction of rotation of said shaft and to so remain throughout the continued rotation of the shaft. Two contact rollers 860 and 861 diametrally opposite are adapted to engage the disc 850 and alternately contact with contact 852. Two similar rollers 862 and 863 are diametrally positioned and correspond with rollers 860 and 861 and are adapted to alternately engage the respective contact 853 and the contacts 854 or 855.

Operating in conjunction with the speed matching and synchronizing mechanism a control relay S is employed which comprises a coil S1 and two normally open switches S2 and S3. In addition to this relay, a safety relay SE and an auxiliary relay SF are employed for operating the circuit breaker CBB. The relay SE comprises a coil SE1 and two normally open switches SE2 and SE3. The relay SF comprises a coil SF1, two normally open switches SF2 and SF3 and a timing device SF4 which retards the closing of relay SF and allows it to open instantly.

The various parts of the synchronizing and speed matching mechanism are connected together as will now be described. Current for operating the two motors 832 and 833 and for operating the synchronizer 845 is procured by means of the transfer relay XB through the following circuits. The bus 777 from transformer 769 is connected through a conductor 864 with switch XB5 of relay XB. This switch is in turn connected through conductor 865 with another bus 866. Bus 866 is directly connected to one of the terminals 867 of motor 832. The common terminal of this motor is connected to another bus 869. This bus is connected through a conductor 870 with switch XB2 which in turn is connected through a conductor 871 with the bus 776 which as previously explained is connected to the transformer 768. It will hence be readily comprehended that when the two switches XB5 and XB2 are closed three-phase current is provided for operating motor 832.

Motor 833 as previously stated is operated from the potential of the generator line GLB. Transformers 815 and 816 are utilized for this purpose. The bus 872 is connected to the secondary 819 of transformer 815 and also to switch XB3. Switch XB3 is connected through conductor 873 with a bus 874 which in turn is connected to the terminal 875 of motor 833. The common terminal of this motor is connected through a conductor 876 with the common bus 775. The other terminal of this motor is connected through a conductor 877 with a bus 831. This bus is connected through a conductor 830 with switch XB4. Switch XB4 is connected through conductor 829 with bus 824 which in turn is connected through switch MB4 with conductor 822, the latter conductor leading from the secondary of the transformer 816. When switch XB4 and switch XB3 are closed motor 833 is provided with current from the generator line operating said motor at a speed corresponding with the frequency of the potential in the generator line.

The motor 810 for controlling the governor 759 is operated through contactor 841 and the two contacts 843 and 844. In conjunction with these two contacts two centrifugal switches 879 and 880 are employed which are adapted to be operated by the governors 834 and 837 and which become closed when the two motors 832 and 833 reach substantially synchronous speed. The motor 810 is preferably provided with two windings connected together through a common conductor 881 with the common bus 775. The other two terminals of motor 810 are connected through two conductors 882 and 883 with the two switches XB6 and XB7. These switches are in turn connected through conductors 884 and 885 with two busses 886 and 887 directly connected to contacts 843 and 844. Both the contact fingers 840 and 841 are connected to a conductor 888 which in turn is connected to switch 879. Switch 879 is connected through a conductor 893 with switch 880 which in turn is connected through a conductor 894 with bus 874 previously referred to.

When the contactor 841 engages one of the contacts 843 or 844 a circuit is completed through motor 810 which causes said motor to rotate in a particular direction depending upon which one of the contacts 843 or 844 is closed. Assuming contactor 841 to be contacting with a contact 843, the following circuit would be closed. Commencing at the common 775, current would then flow through conductor 881, motor 810, conductor 882, switch XB6, conductor 884, bus 886, contact 843, contactor 841, conductor 888, switch 879, conductor 893, switch 880, conductor 894 and to the bus 874. From this bus, current would flow through conductor 873, switch XB3, conductor 872, and back to the transformer 815. When the contactor 841 contacts with contact 844, a similar circuit is completed through the other winding of motor 810 which causes said motor to operate in the opposite direction. As the two motors 832 and 833 operate, variations in the speed thereof caused by difference in the frequencies of the generator to be cut in and the distribution system cause the relative movement of the contactor 841 with respect to the contacts 843 and 844 which in turn operates motor 810 to re-adjust the governor and cause the generator to rotate at the proper speed.

When the generator produces voltage of the proper frequency, contactor 841 is just in between the two contacts 843 and 844 and contactor 840 is in contact with contact 842. Contact 842 is connected through a conductor 895 with the coil S1 of relay S which in turn is directly connected to the common bus 775. The two switches S2 and S3 of this relay control the current for energizing the synchronizer 845. The switch S3 is connected through a conductor 897 with bus 866 which as previously explained is energized from transformer 769. The switch S2 is connected through a conductor 898 with bus 831 which as previously explained is energized from transformer 816. The switch S3 is further connected through a conductor 899 with the binding post 848 of synchronizer 845 while the switch S2 is connected through a conductor 900 with the other binding post 847 of said synchronizer. The common binding post 846 of the synchronizer is connected through a conductor 901 with the common bus 775. As soon as relay S1 is closed the synchronizer 845 is energized and commences to rotate.

The relays SF and SE are connected to the other parts of the synchronizing apparatus as follows. A conductor 902 connects the roller 860 with switch SE2 and also with coil SE1 which latter is directly connected to the bus 775. Another conductor 903 is connected to switch S2 and also to switch SE2. Switch SE3 is connected through a conductor 904 with roller 861 and through another conductor 905 with both the switch SF2 and the coil SF1 of relay SF. Coil SF1 of this relay is directly connected to the common bus 775. Switch SF2 of relay SF is connected through a conductor 906 with roller 862. Switch SF3 of this relay is connected through a conductor 907 with roller 863 and to a bus 908 which operates the circuit breaker in a manner to be presently described. The shaft 849 of synchronizer 845 is connected through a conductor 911 with conductor 900 previously referred to.

In the connection of the generator to the system, it is necessary that the relay SF first close before the circuit breaker can be connected. The circuit through the coil SF1 of this relay is broken through switch SE3. It hence becomes necessary that relay SE which is a safety relay be operated before the generator can be synchronized with the system. Roller 860 is in the circuit through the coil SE1 of relay SE. A circuit is completed through this coil when the shaft 849 has rotated sufficiently to bring the contact 852 of disc 850 in contact with roller 860. When this occurs, the following circuit may be traced. Commencing with bus 831 which, as previously stated, was connected to transformer 816, current flows through current conductor 898, through switch S2, which was closed upon contactor 840 contacting with contact 842, through conductor 900, conductor 911, shaft 849, contact 852, roller 860, conductor 902, coil SE1 and back to the common bus 775. This operates relay SE closing switches SE2 and SE3. Relay SE is maintained through the switch SE2. The circuit for maintaining this switch also commences at bus 831 and includes conductor 898, switch S2, conductor 903, switch SE2, conductor 902, coil SE1 and the common bus 775. Relay SE is now maintained closed and the operation of this relay completes another circuit through switch SE3. Commencing with shaft 849 of relay 845 which as previously explained is connected to transformer 816 current flows through contact 852, roller 861, conductor 904, switch SE3, conductor 905, coil SF1 of relay SF and back to the common bus 775. This energizes relay SF which closes switches SF2 and SF3. Switch SF2 is a maintaining switch for relay SF. Due to the position of contact 853 and contact 852 roller 862 is in engagement with contact 853 when roller 861 is in contact with contact 852. Current then flows from shaft 849 through contact 853, roller 862, conductor 906, switch SF2, conductor 905, and through coil SF1 of relay SF back to the common bus 775. This maintains the circuit through relay SF maintaining switch SF3 closed. Closing of relay SF is retarded through the device SF4. If the duration of contact through roller 861 and contact 852 is sufficient, switch SF3 is finally closed and the circuit breaker operated.

The two contacts 854 and 855 are placed on the disc 851 in such positions that the same are in advance of the roller 863 when the disc 851 is so disposed that the current in the distribution system from the generator have the same phase relation. It hence becomes evident that the roller 863 engages these contacts slightly before the two currents are in phase. This is for the purpose of compensating for the time required by the circuit breaker to close, particularly where slow acting circuit breakers are employed. Under proper conditions, current flows from the shaft 849 through finger 859 through either of the contacts 857 or 858 as the case may be and the corresponding contacts 854 and 855 connected therewith through roller 863, conductor 907, switch SF3, and bus 908 to the apparatus for operating the circuit breaker which will be presently described in detail. The reason for the use of the finger 859 and the two contacts 857 and 858 is to prevent the unintended closing of the circuit breaker in the event the same is not closed when the roller 863 passes over the first contact. In such case the speed of the disc 851 might be such as to cause closing at such latter contact, circuit being broken in the second contact through finger 859.

For the purpose of operating the circuit breaker CB an auxiliary relay SH is employed. This relay comprises a coil SH1 and a normally open switch SH2. This relay is further timed through a dash pot SH3 to cause the switch SH2 to quickly close and to remain closed for a predetermined length of time after the deenergization of coil SH1. The coil SH1 is connected through a conductor 912 with the common bus 775 and through another conductor 913 with switch XB8. Switch XB8 is connected through a conductor 910 with bus 908 previously referred to. The switch SH2 is connected through a conductor 914 with the coil CBB1 of circuit breaker CBB which coil is further connected through two conductors 915 and 916 with the common bus 775. The other side of the switch SH2 is connected through a conductor 917 with conductor 824, which as previously described was connected to conductor 829 and to switch MB4 of relay MB.

When switch SF3 is closed and roller 863 is in contact with one of the contacts 854 or 855 the following circuit is established. Commencing with the bus 822 connected to transformer 816 current flows through conductor 823, in B4, 824, conductor 829, switch S2, conductor 900, conductor 911, shaft 849, contact finger 859, contact 857 or 858, corresponding contacts 855 or 854, roller 863, conductor 907, switch SF3, bus 908, conductor 910, switch XB8, conductor 913, coil SH1, conductor 912, and back to the common bus 775. This operates the relay SH. Another circuit is then completed through the switch SH2 of said relay. Commencing with the common bus 775, current flows through conductor 916, conductor 815, coil CBB1, conductor 914, switch SH2, conductor 917, conductor 824, switch MB4, and bus 822 back to the transformer 816. This energizes the circuit breaker CBB closing the various switches thereof and connecting the generator line GLB to the distribution line DL. At the same time, switches CBB5 and CBB6 are closed and switch CBB7 opened. The relay SH is maintained closed through the contact 853 on disc 851 and the roller 862. Due to the peripheral extent of the contact 853 the circuit is maintained closed through this contact and the roller 862 a sufficient length of time to cause the closure of the circuit breaker CBB which is held latched through the latch lug LB2 of solenoid LB to be presently described in detail.

For maintaining circuit breaker CBB closed, a latch solenoid LB is employed having a coil LB1. This solenoid is provided with a latch LB2 which is adapted to engage a latch lug LB3 on the circuit breaker and to magnetically hold the said circuit breaker closed when once the same has been actuated. The latch member LB2 remains in latched position once the same has been latched until it is tripped through the operation of the coil LB1 thereof.

As soon as circuit breaker CBB goes in, the normally closed switch CBB7 of the circuit breaker is open. This opens the circuit through the coil XB1 of transfer relay XB deenergizing this relay and disconnecting the synchronizing apparatus from the generator 751 and associated circuits thereof. The synchronizing apparatus is now available for use for synchronizing the other generator 750, or in the case more than two generators are employed, one of the other generators.

For the purpose of regulating the voltage system, the voltage regulator 781 is employed which is provided with a direct current coil 921, and an alternating current coil 922. These coils actuate either or both of two vibrators 923 and 924 which operate in conjunction with fixed contacts 925. The vibrator 923 serves to regulate the voltage of the exciter 761 while the vibrator 924 serves to regulate the voltage of the exciter 762. The AC coil 922 is connected through a conductor 125 with the common bus 775 while said coil is further connected through a conductor 926 with the bus 777 leading from transformer 769. The coil 921 is connected to two busses 927 and 928 which may receive potential from either of the exciters 761 or 762. For connecting the potential regulator to the exciter 762 a relay ED is employed which comprises a coil ED1, four normally open switches ED2, ED3, ED4 and ED5 and one normally closed switch ED6. The coil ED1 of this relay is connected through a conductor 929 with a common bus 775 and through a conductor 930 with conductor 920 previously referred to which is closed through the circuit breaker CBB. When the circuit breaker CBB is operated, a circuit is established which energizes the coil ED1 from transformer 816, operating relay ED.

Operating in conjunction with the voltage regulator is a rheostat 931 which is connected through a conductor 932 with the rheostat 792 and with the conductor 793. This rheostat is further connected through a conductor 933 with the shunt coil 767 of the exciter 762. The rheostat 931 may be shunted through the switch ED6 of the relay ED and through a switch EG2 of a relay EG having a coil EG1. The coil of this relay is connected through a conductor 934 with the conductor 793 from the armature 765 of exciter 762 and through another conductor 935 with the series coil 766 of the exciter 762 so as to receive potential directly from the exciter. When the exciter voltage builds up sufficiently the switch EG2 which is a normally closed switch is opened and the circuit therethrough broken. This switch is connected through a conductor 936 with the conductor 793 and is further connected through a conductor 937 with switch ED6. Switch ED6 is connected through a conductor 938 with switch ED5 and also through a conductor 943 with conductor 933 leading from rheostat 931. Both switches ED6 and EG2 are normally closed switches so that in the initial operation of the exciter 762 the rheostat 931 is shunted and full potential is had on the field coil 756 of the generator 751 until the generator and exciter get up to speed and the exciter delivers sufficient voltage to operate coil EG1. When this occurs, the circuit shunting the rheostat 931 is broken and the rheostat 931 may thereafter control the voltage regulator to maintain the proper voltage at the exciter and the corresponding voltage in the distribution line. When the voltage regulator is finally connected, which occurs when relay ED is operated, switch ED6 is also opened causing the further opening of the circuit shorting the rheostat 931.

The rheostat 931 is adapted to be shorted through the vibrator 924 of the voltage regulator 781 through the following circuit. This circuit comprises a conductor 939 which is connected to conductor 793 and indirectly to the rheostat 931. Said conductor is further connected to switch ED4 of relay ED. Switch ED4 is connected to a conductor 940 which in turn is connected to bus 927. A conductor 941 leads from the bus 927 to the fixed contacts 925 of the voltage regulator. Vibrator 924 is connected through conductor 942 to switch ED5 which in turn is connected through the conductor 943 with the other side of the rheostat 931. By means of this circuit, it can readily be comprehended that when the relay ED is actuated and switches ED4 and ED5 closed that the vibrator 924 may function to short out the resistance of the rheostat 931 in a manner to control the voltage of the exciter 762 as is now well understood in the art.

Current for operating the direct current coil 921 is procured through the bus 928 and through the bus 927 previously referred to. A conductor 945 is connected to the switch ED2 and also to the bus 928. Switch ED2 is further connected through a conductor 946 with the series coil 766 of exciter 762. When the relay ED is closed, current is had through the switches ED2 and ED4 from the exciter 762 which energizes the buses 927 and 928 and provides current for the distant current coil 921 of the voltage regulator.

In the normal shut down of the generator the following procedure is adopted: Switch 798 at the control station is first opened which de-energizes master relay MB. This opens switch MB3 which controls the current through the starting solenoid 808. Deenergization of this solenoid causes the governor to close the gate and reduce the speed of the prime mover. As the gate closes the generator reduces speed until finally the generator comes to rest. The deenergization of relay MB at the same time disconnects the various circuits associated with the generator so that when the generator finally comes to rest, the entire apparatus associated therewith is completely disconnected from the distribution system.

The speed matching apparatus, the synchronizing apparatus and the voltage regulating apparatus may also be used in conjunction with the generator 750 for automatically connecting the same to the line and for controlling the voltage of the distribution system.

For providing potential for operating the various apparatus used in conjunction with the control and operation of the generator 750, two transformers 987 and 988 are employed which are provided with primaries 989 and 990 and with secondaries 991 and 992. The primaries 989 and 990 are connected together and to phase 2 of the generator line GLA through a conductor 993. These primaries are further connected through conductors 994 and 995 with the phases 3 and 1 of the generator line GLA. The secondaries 991 and 992 of these transformers are connected together through a conductor 996 which in turn is connected to the common bus 775. The secondary 992 is connected to a bus 997 which serves to feed certain of the apparatus used while the secondary 991 is connected to a conductor 986 which will be again referred to.

The master relay MA for generator 750 similar to the master relay MB is operated from the control line 778 and 779. This relay is connected in much the same manner as the relay MB having, however, an additional switch MA6. The switch 200 in the control station is used to control the operation of relay MA. This switch is connected to the side 779 of the control line and is connected through a conductor 1008 to both of the switches AA2 and AA3 of the relay AA and also to all three of the switches MA3, MA2, and MA6 of master relay MA. Switch AA2 is connected to switch MA2 through a conductor 1015 which shunts the switch MA2. Switch MA2 is further connected through a conductor 1009 to a normally closed switch EC6 of the exciter relay EC which in turn is connected through a conductor 1011 with coil MA1 of relay MA. This coil is in turn connected through a conductor 1012 with bus 796 leading from the side 778 of the control line. The conductor 1009 connected with switch MA2 is further connected through a conductor 1015 with the normally closed switch AA2 of anti-start relay AA. This switch in turn is connected to the conductor 1008 leading from switch 200. When switch 200 is closed a circuit is established through the coil MA1 which energizes relay MA and closes the various normally open switches thereof. This circuit may be traced as follows. Commencing with bus 796 from the side 778 of the control line, current flows through conductor 1012, coil MA1 of relay MA, conductor 1011, normally closed switch EC6, conductor 1009, conductor 1015, switch AA2, conductor 1008, back to the other side 779 of the control circuit through the switch 200. This energizes coil MA1 and operates relay MA. Operation of relay MA closes switch MA6 which completes a circuit through the coil AA1 of anti-start relay AA. This circuit includes a conductor 1013 which is connected to said switch and to the coil AA1 of relay AA. This coil is further connected through a conductor 1014 to the bus 796. When the switch MA6 is closed the following circuit is completed. Starting with bus 796, current flows through conductor 1014, coil AA1, conductor 1013, switch MA6, conductor 1008 and through switch 200 back to the other side 779 of the control line. The energizing of coil AA1 of relay AA closes switch AA3 and at the same time opens switch AA2. The circuit for energizing coil MA1 included switch AA2 and said circuit would have been opened excepting for the switch MA2 on relay MA which is in parallel with the switch AA2 and which maintains the energizing circuit for said relay.

The relay AA is maintained operated through the switch AA3 thereof. This switch is connected through the conductor 1013 with coil AA1. When switch AA3 is closed the following circuit may be traced. This circuit includes conductor 1008, switch AA3, conductor 1013, coil AA1, conductor 1014, which conductors 1008 and 1014 are fed from the control circuit 778 through the switch 200. Relay AA is now maintained until the switch 200 is manually opened so that in case the system is shut down through failure, the same cannot be reconnected unless the operator manually operates switch 200.

The closing of the master relay MA closes switch MA3 which sets the governor 757 into operation. This switch is connected to the conductor 1008 which, as previously brought out, is connected to side 779 of the control line through switch 200. Switch MA3 is further connected through a conductor 1017 with solenoid 805 which in turn is connected through a conductor 1018 with bus 796 leading from the side 778 of the control line. Energization of this solenoid operates the governor 757 which opens the gate controlling the flow of water to the turbine and sets the generator 750 into operation.

The armature 962 of the exciter 761 is connected to a rotating part of the generator 750 so that said exciter is brought up to speed as the generator comes up to speed. The exciter 761 is connected through various circuits to excite the field coil 753 of generator 750 as will be presently described in detail, which causes the generator 750 to deliver potential to the generator line GLA. This provides potential at the transformers 987 and 988 which furnish current for operating certain of the equipment used in conjunction with the generator 750. After the governor 757 gets up to speed, the centrifugally operated switch 758 is closed which, as will be presently explained, functions to set in operation the various synchronizing and speed matching apparatus in conjunction with generator 750.

For the purpose of connecting the generator to the speed matching and synchronizing apparatus, the switch XA previously referred to is employed. This switch is connected to the various busses and conductors from the speed matching and synchronizing apparatus in exactly the same manner as the transfer relay XB. The switches XA2, XA3, XA4, XA5, XA6, XA7 and XA8 are connected through conductors 979, 980, 981, 982, 983, 984 and 985 with the various busses and conductors 869, 874, 831, 866, 886, 887, and 908 respectively. The switch XA2 is also connected through a conductor 978 with bus 776. Switch XA3 is connected through a conductor 986 with the secondary 991 of transformer 987. Switch XA4 is connected through a conductor 998 with switch MA4 of master relay MA. Switch MA5 and MA4 are connected through a conductor 999 with bus 997 leading from transformer 988. Switch XA5 is connected through a conductor 1000 with bus 777. The two switches XA6 and XA7 are connected through conductors 1001 and 1002 to the two windings of the motor 897 of the governor 757, the common connection of the windings of this motor being connected through a conductor 1003 with the common bus 775. Coil XA1 of relay XA is connected to the common 775 through a conductor 1004 and is further connected through a conductor 1005 with the switch XB9 of relay XB. This switch is in turn connected through a conductor 1006 with the centrifugally operated governor switch 758 which in this case is connected through a conductor 1016 to a normally closed switch LA2 of the latch relay LA for the circuit breaker CBA. Conductor 1007 connects this switch with the conductor 998 previously referred to, which as stated was connected to switch MA4 of master relay MA.

When the master relay MA is closed, a circuit is completed from bus 997 leading from transformer 988 through conductor 999, switch MA4, conductor 998, conductor 1007, switch LA2, conductor 1016, switch 758, conductor 1006, switch XB9, conductor 1005, coil XA1 of relay XA, conductor 1004, back to the common bus 775. This energizes relay XA closing the various switches thereof and connecting the generator system to the speed matching and synchronizing apparatus in identically the same manner as relay XB. The speed matching then commences and motor 807 is energized to rotate in either direction to vary the speed of the generator so as to bring the current in the generator line in synchronism with the current in the distribution line. Inasmuch as the operation of the speed matching and synchronizing of the generator 750 is identically the same as with the generator 751, the operation of the same will not be repeated. When, however, the generator is in synchronism, an auxiliary relay SG is energized which serves to close the circuit breaker CBA. This relay comprises a coil SG1 and a normally open switch SG2. The coil SG1 is connected through a conductor 1019 with the common bus 775, and is connected through another conductor 1020 with switch XA8 of relay XA. When relay XA is closed, current flows from transformer 988 through bus 997, conductor 999, switch MA4 of master relay MA, conductor 998, switch XA4, bus 831, conductor 898, switch S2 of the synchronizing relay which is closed after synchronizing commences, conductor 900, conductor 911, shaft 849, contact 854 or 855, roller 863, conductor 907, switch SF3, conductor 908, conductor 935, switch XA8, conductor 1020, coil SG1 and conductor 1019 back to the common bus 775. This operates relay SG. The switch SG2 of relay SG is connected through a conductor 1021 with coil CBA1 of circuit breaker CBA which in turn is connected through conductor 1022 with the common bus 775. The other side of switch SG2 is connected through a conductor 1023 with conductor 998 which is connected to the transformer 988 through switch MA4 and conductors 999 and 997. Closure of switch SG2 energizes coil CBA1 which closes the circuit breaker and connects the generator to the line.

The latch relay LA comprises a coil LA1, and a normally closed switch LA2, previously referred to. When the relay is in normal position it is disengaged from the circuit breaker. When energized, it opens switch LA2 and engages a suitable latch member on said circuit breaker holding it in closed position. Inasmuch as the relay XA is energized through a circuit including switch LA2 on the latch relay LA, relay XA will be opened when the latch relay is energized. This relay is energized through a circuit including the switch CBA6 on the circuit breaker. It must hence become evident that relay SG must be maintained long enough to cause the circuit breaker to close since the said relay is maintained from relay XA which in turn is indirectly dependent on the circuit breaker for current. The coil LA1 of the latch relay LA is connected through a conductor 1026 with switch CBA6 of the circuit breaker CBA. This switch is further connected through a conductor 1027 with the conductor 784 from the exciter 761. The other side of the coil LA1 of relay LA is connected through a conductor 1029 with the conductor 787 from exciter 761. Thus, current normally flows through the latch relay coil LA1 which holds the circuit breaker CBA closed.

When the generator 750 is connected to the distribution line DL, the exciter 761 thereof is connected in parallel with the exciter 762 to the potential regulator 781. This is accomplished through the relay EC which is similar to the relay ED. This relay comprises a coil EC1, four normally open switches EC2 and EC3, EC4 and EC5, and a normally closed switch EC6. Operating in conjunction with the relay EC is another relay EF comprising a coil EF1, a normally closed switch EF2, and a normally open switch EF3. The coil EC1 of relay EC is connected through a conductor 1031 with the common bus 775, and is connected through another conductor 1032 with the switch CBA5 of the circuit breaker CBA. This switch is in turn connected through a conductor 1033 with conductor 1023 which in turn is connected to conductor 998, said latter conductor, as previously brought out, being connected through the master relay with the transformer 988. When the circuit breaker CBA closes, switch CBA5 closes and current is established through the coil EC1 of relay EC operating said relay and closing the various normally open switches thereof. The switches EC2, EC3 and EC4 are connected through conductors 1034, 1035, and 1036 with the current coil and the two brushes of the armature of the exciter 761 in the same manner as relay ED. The two switches EC2 and EC4 are connected to the conductors 926 and 927 the same as switches ED2 and ED4 of relay ED. The two switches EC3 and ED3 are both connected together through a conductor 1035. The switch EC5 of relay EC is connected through a conductor 1036 with a second rheostat 1037 which in turn is connected to the conductor 787 and the rheostat 786. Switch EC5 is further connected through a conductor 1038 with the vibrator 823 of the potential regulator 781. When the coil EC1 is closed, the two exciters 761 and 762 are connected together in parallel, and to the voltage regulator 781. This regulator functions as previously described to regulate the voltage of the distribution system and the two exciters.

To cause the generator 751 to build up rapidly the rheostat 1037 is shunted during the initial operation of the exciter. This is accomplished through relay EF. The coil EF1 of this relay is connected through a conductor 1039 with the conductor 787 leading from the armature 962 of said exciter. The other side of this coil is connected through another conductor 1040 with the conductor 1034 leading to the series field coil 763 of said exciter. When the exciter voltage builds up sufficiently the coil EF1 is energized and the relay EF operated. The switch EF2 of this relay is connected through a conductor 1041 with one side of the rheostat 1037 and through the conductor 1036 previously referred to to the other side of said rheostat. Switch EF2 being a normally closed switch normally shunts the rheostat 1037 giving the exciter maximum voltage before starting. When this switch opens, the rheostat 1037 is cut in to bring the voltage to normal prior to the connection of the generator to the system.

Relays EC and EF form a protective device for opening the master relay MA in the event that the exciter 761 drops below a predetermined value. The master relay coil MA1 is included in a circuit containing switches EC6 and EF3 in parallel. Switches EC6 and EF3 are connected together through two conductors 96 and 97. Switch EC6 serves to close the control circuit prior to the closing of the circuit breaker. Switch EF3 is a protective switch which is adapted to open the control circuit in case the exciter voltage drops to a predetermined value. Normally this switch is open. However, switch EC6 is normally closed and the circuit completed through it. When the exciter voltage builds up, relay EF is operated and switch EF3 is closed, paralleling switch EC6. Thereafter when the shunt circuit through switch EC6 is opened which occurs when the exciter is connected to the busses 928, 927 and 1035, the control circuit is maintained closed through said switch EF3. After such opening of switch EC6, further opening of switch EF3 through drop in potential of the exciter will open the control circuit and shut down the system.

In order to reduce the load on the generator in case the generator overspeeds, relay NA is employed. The relay NA includes coil NA1, two normally closed switches NA2 and NA3 and a normally open switch NA4. In addition to this relay, a mercury switch 1062 is employed which is mounted upon the generator and which is adapted to close when the generator rotates at a predetermined speed. In order to simplify the connections of this switch to the system, the common bus 775 is grounded and likewise one side of the switch 1062 is grounded. The other side of this switch is connected through a suitable slip ring or equivalent device and through a conductor 1063 with the switch NA3 of relay NA. This switch is connected to the switch NA4 and also to the coil NA1 of said relay through conductor 1064, said coil being directly connected to a conductor 1053, leading from conductor 1032. When switch 1062 is closed, current flows from the ground through said switch, through conductor 1063, switch NA3, conductor 1064, coil NA1, conductor 1053 and conductor 1032, which as previously described, is connected to the transformer 988 through the circuit breaker switch CBA5 and through the master relay switch MA4. Closure of this circuit energizes coil NA1 of relay NA which operates said relay. The relay NA is of such design that the switch NA4 is closed and both switches NA3 and NA2 opened upon said relay being initially energized through the switch NA3 so that once the said relay is started the same continues to operate until switch NA4 is closed and the switch NA3 opened. Closure of switch NA4 controls another circuit. This switch is connected through a conductor 1065 with the common bus 775. The actuation of relay NA opens switch NA2 which deenergizes the load pick up solenoid 806 taking off the load and causing the generator to slow down.

For the purpose of causing the generator 761 to take on load the solenoid 806 previously referred to, is employed. This solenoid is connected through a conductor 1051 with the common bus 775 of the system. The said solenoid is further connected through a conductor 1052 with a normally closed contact NA2 of the relay NA to be subsequently referred to. The switch NA2 is connected through a conductor 1053 with the conductor 1032 previously referred to. The circuit through solenoid 806 is controlled through the switch CBA5 of the circuit breaker CBA and may be traced as follows: Commencing with the transformer 982, current flows through conductor 997 through conductor 999 through switch MA4 of the master relay MA which of course is closed throughout the operation of the system, through conductor 998, through conductor 1023, through conductor 1033, through switch CBA5, which has been closed upon the operation of the circuit breaker, through conductor 1032, through conductor 1053, through switch NA2, through conductor 1052, through the solenoid 806 and through the conductor 1051 back to the common bus 775. Actuation of this solenoid controls the action of the governor causing the gate to open and the generator to take on load.

The advantages of my invention are manifest. The system is fully automatic in all respects. The system may be remotely controlled and operated to perform all of the functions of a manually controlled system. The system is extremely flexible and adaptable to varying conditions of load and water supply. Protective devices are embodied which prevent injury to the machinery and to the system. The system is practically fool proof and employs only such equipment as will not readily get out of order.

Changes in the specific form of my invention as herein disclosed may be made within the scope of what is claimed, without departing from the spirit of my invention.

Having described my invention, what I claim as new and desire to protect by Letters Patent is:

1. In combination with a distribution system and a plurality of generators adapted to be connected thereto and each having an exciter, an exciter bus, circuit breakers for connecting said generators to the distribution system and means operated by each of said circuit breakers for connecting the corresponding exciter to said exciter bus upon connection of its generator to the distribution system.

2. The combination with a power line, a plurality of generators and a remote selecting apparatus for determining the connection of a selected generator to the power line, of a single control apparatus, transfer relays for each generator for connecting the generator to the control apparatus, main switching means for each generator for connecting the generator to the power line, means for connecting said remote apparatus to said transfer relays extending through contacts of the main switching means which are closed when said main switching means is in position for disconnecting the generator and power line, energizing circuits for said control apparatus extending through said transfer relays, and actuating circuits for said main switching means under the control of said transfer relays and control apparatus and whereby the remote apparatus may actuate the selected transfer relay and thereby produce a coupling of said control apparatus with the corresponding generator and a closing of said corresponding main switching means from said control apparatus, and whereby the main switching means in closing accomplishes a reverse actuation of the transfer relay and thereby uncouples said control apparatus from the corresponding generator.

3. The combination with a power line, a plurality of generators and a remote selecting apparatus for determining the connection of a selected generator to the power line, of a single control apparatus, transfer relays for each generator for connecting the generator to the control apparatus, main switching means for each generator for connecting the generator to the power line, means for connecting said remote apparatus to said transfer relays extending through contacts of the main switching means which are closed when said main switching means is in position for disconnecting the generator and power line, said connecting means for each transfer relay extending through contacts in all other transfer relays which are closed when the other transfer relays are in unactuated condition and are open when the corresponding transfer relay has been actuated, energizing circuits for said control apparatus extending through said transfer relays, and actuating circuits for said main switching means under the control of said transfer relays and control apparatus and whereby the remote apparatus may actuate the selected transfer relay and thereby produce a coupling of said control apparatus with the corresponding generator and a closing of said corresponding main switching means from said control apparatus, and whereby the main switching means in closing accomplishes a reverse actuation of the transfer relay and thereby uncouples said control apparatus from the corresponding generator.

4. The combination with a distributing system and a plurality of generators adapted to be connected thereto and each having an exciter, an exciter bus, circuit breakers for connecting said generators to the distributing system, resistances in series with the field coils of said exciters, switches for shunting said resistances, means responsive to the exciter voltage for opening the switch corresponding to the exciter when the exciter voltage reaches a predetermined value, and means for connecting each exciter to the exciter bus upon connection of the corresponding generator to the distribution system.

5. The combination with a distributing system and a generator adapted to be connected to said system, of main switching means for connecting the generator to said system, a synchronizer operated by the generator and system for controlling the closing of said main switching means, actuating means for closing the main switching means and including an actuating circuit, a normally open switch in said circuit, means controlled by said synchronizer for closing said switch rapidly, a time delay device for maintaining said switch closed for a predetermined length of time, means for restoring said switch to its normally open position at the expiration of said time, whereby said actuating circuit is closed at said switch for said predetermined length of time, and a further switch controlled by the synchronizer for completing the closing of said actuating circuit at a time interval after the closure of said normally open switch varying inversely with the frequency difference of the generator and system.

6. The combination with a distribution system and a generator adapted to be connected thereto and having an exciter, of main switching means for connecting said generator to the system, an exciter field rheostat, a control relay including contact means connected in shunt of at least a part of said field rheostat, circuit means responsive to the exciter voltage for opening the contact means at a predetermined exciter voltage, said contact means operating when closed to ensure a quick pick-up of the exciter, said circuit means being connected to said control relay, further contacts controlled by said relay and closed thereby at a predetermined exciter voltage, means for holding said main switching means closed, auxiliary contacts closed when the main switching means is closed, and further circuit means connecting said further and auxiliary contacts and operative to energize said holding means from said exciter after the main switching means has been closed.

7. The combination with a distribution system and a generator plant, of main switching means for connecting said generator to the system, a master relay, means controllable from a remote point for energizing said master relay and including a circuit, a second relay having normally closed contacts, a safety switch closed from the generator when the latter is in condition for starting, a further circuit including said contacts and switch for actuating said master relay, generator synchronizing means and circuits therefor, said synchronizing circuits being closed upon energization of said master relay, means controlled by the said synchronizing means for closing said main switching means through said master relay, a second normally open safety switch connected for closing when the generator plant is not in condition for connection to the system, and a circuit including said second safety switch for actuating said second relay to open the contacts thereof and deenergize said master relay and thereby prevent closing of said main switching means.

8. The combination with a distribution system, of a plurality of generators and a remote selecting apparatus for determining the connection of a selected generator to the system, of a single synchronizing means capable of bringing any said generator into synchronism with the system and including circuits suppliable from the system and the selected generator, selecting relay means controlled by said remote apparatus for connecting said synchronizing means to a selected generator for synchronizing the same, main switching means for each generator for connecting the generator to the system, means actuated through said synchronizing means for closing the main switching means of the selected generator when the associated generator is at a predetermined condition of synchronism with respect to the system, and means independent of the synchronizing means for maintaining said main switching means closed when the selecting relay means has been operated to disconnect the synchronizing means from said corresponding generator.

9. The combination with a distribution system, a plurality of generators and a remote selecting apparatus for determining the connection of a selected generator to the system, of a single synchronizing means for said generators, a transfer relay for each generator, a main switching means for each generator for connecting it to the system, means operated from said remote selecting apparatus for closing the transfer relay of the selected generator, means controlled by the transfer relay for connecting the synchronizing means to the selected generator for bringing the same to synchronism, means controlled by the synchronizing means through the selected transfer relay for closing the corresponding main switching means, and means responsive to said selecting apparatus and independent of the transfer relay and synchronizing means for maintaining the main switching means closed.

ERICK PEARSON.